(12) United States Patent
Hoogzaad et al.

(10) Patent No.: US 9,078,318 B2
(45) Date of Patent: *Jul. 7, 2015

(54) SWITCHED MODE POWER CONVERTER AND METHOD OF OPERATING THE SAME

(71) Applicant: NXP B.V., Eindhoven (NL)

(72) Inventors: Gian Hoogzaad, Mook (NL); Peter Deurenberg, s-Hertogenbosch (NL)

(73) Assignee: NXP B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/340,973

(22) Filed: Jul. 25, 2014

(65) Prior Publication Data

US 2014/0333224 A1 Nov. 13, 2014

Related U.S. Application Data

(60) Division of application No. 13/963,271, filed on Aug. 9, 2013, now Pat. No. 8,810,160, which is a continuation of application No. 13/002,684, filed as application No. PCT/IB2009/052826 on Jun. 30, 2009, now abandoned.

(30) Foreign Application Priority Data

Jul. 9, 2008 (EP) .................................... 08104683

(51) Int. Cl.
*H05B 33/08* (2006.01)
(52) U.S. Cl.
CPC ........ *H05B 33/0815* (2013.01); *H05B 33/0818* (2013.01); *H05B 33/083* (2013.01); *Y02B 20/346* (2013.01)

(58) Field of Classification Search
USPC .............. 315/307, 246, 308, 291, 224, 209 R
See application file for complete search history.

(56) References Cited

U.S. PATENT DOCUMENTS

| 7,710,047 | B2 | 5/2010 | Shteynberg et al. | |
| 7,888,881 | B2 * | 2/2011 | Shteynberg et al. | 315/291 |
| 8,810,160 | B2 * | 8/2014 | Hoogzaad et al. | 315/307 |
| 2005/0073862 | A1 | 4/2005 | Mednik et al. | |
| 2005/0218838 | A1 | 10/2005 | Lys | |
| 2006/0038627 | A1 | 2/2006 | Ahmad | |
| 2006/0238174 | A1 | 10/2006 | Russell et al. | |
| 2007/0267978 | A1 | 11/2007 | Shteynberg et al. | |
| 2009/0273292 | A1 | 11/2009 | Zimmermann | |
| 2010/0194274 | A1 | 8/2010 | Hoogzaad | |
| 2013/0278145 | A1 * | 10/2013 | Lin et al. | 315/122 |

FOREIGN PATENT DOCUMENTS

| WO | 2004/100612 A1 | 11/2004 |
| WO | 2007/069200 A1 | 6/2007 |
| WO | 2007/121870 A1 | 11/2007 |
| WO | 2009/013676 A2 | 1/2009 |
| WO | 2009/115987 A1 | 9/2009 |

OTHER PUBLICATIONS

International Search Report and Written Opinion for Int'l. Patent Appln. No. PCT/182009/052826 (Oct. 6, 2009).

* cited by examiner

*Primary Examiner* — David H Vu

(57) ABSTRACT

A switched mode power converter is disclosed, together with a method for operating the same. The power converter is adapted to be operable in the boundary conduction mode, and operation is interruptible in the absence of any load requirement.

13 Claims, 6 Drawing Sheets

US 9,078,318 B2

SWITCHED MODE POWER CONVERTER AND METHOD OF OPERATING THE SAME

CROSS-REFERENCE TO RELATED APPLICATION

This application is a division of application Ser. No. 13/963,271, filed on Aug. 9, 2013, now U.S. Pat. No. 8,810,160 granted on Aug. 19, 2014 which is a continuation of abandoned U.S. patent application Ser. No. 13/002,684, filed Jan. 5, 2011, which is the national stage of international patent application no. PCT/IB2009/052826 filed Jun. 30, 2009, which claims priority under 35 U.S.C. §119 of European patent application no. 08104683.1, filed on Jun. 9, 2008, the contents of which are incorporated by reference herein.

FIELD OF THE INVENTION

This invention relates to switched mode power converters and a method of operating the same.

BACKGROUND OF THE INVENTION

The current to drive light emitting diodes (LED) for lighting and other applications is commonly provided by a switched mode power supply or other switched mode power converter. Moreover, a single switched mode power converter may be able to provide the current required for multiple LEDs or LED strings. In some applications it is desirable to be able to separately control or dim such individual LEDs or LED strings. It is well known to provide bypass switches in order to provide this control function. In circumstances when all the bypass switches connected to a switched mode power converter operating as an LED current generator are conducting, such that all the LEDs are off, it is feasible to also turn off the current generator in order to save power.

The power savings that can be obtained by switching off a current generator for multiple of strings of LEDs can be substantial. This is illustrated in FIG. 1. FIG. 1 shows the variation of the driver efficiency with varying light level. Dashed line 1 indicates the driver efficiency where the current generator is always on. Contrastingly, dot-dashed line 2 indicates the efficiency obtainable by selectively switching off the current source, where solid line 3 indicates the on-off duty cycle of the current source so selectively switched. The system modelled in this figure has two bypass switches connected to a single current source. The LEDs connected in parallel with the two bypass switches, that is to say, the two LED channels, are both switched using pulse width modulated (PWM) signals. Both of the LED channels are 100% ON at the 100% light level, but are 50% out of phase. This represents a worst case situation. Thus, the solid curve 3 indicates the percentage of the PWM duty cycle for which the current generator is required to be on. The efficiency for a system which does not turn off the current source is shown in dashed line 1, whereas dot-dashed line 2 shows the system efficiency when the current generator is turned off when not required.

As shown in FIG. 1 a system efficiency improvement from approximately 12% to above 80% may be obtained for a 1% light level. For smaller or zero phase shift between the two bypass switches, and, or alternatively, for PWM duty cycle(s) smaller than 100%, even larger efficiency improvements are possible.

The efficiency at partial load, that is to say less than 100%, of solid state LED lighting systems is becoming increasingly important from an integral energy efficiency point of view, or total cost of ownership. With the increasing cost of power, this trend is becoming visible in other areas such as mains-connected consumer systems like personal computers and televisions, professional infrastructure systems such as router stations and server banks, as well as automotive applications. Methods and systems which contribute to power saving for a current generator combined with LED bypassing is thus of significant commercial interest.

Three basic methods of operating a switched mode power supply are illustrated in the current vs. time graphs of FIG. 2. FIG. 2(a) illustrates continuous conduction mode (CCM) operation. In this mode the current through the power supply inductor is always larger than zero. A second mode of operation is illustrated in FIG. 2(b). This is the so called boundary conduction mode (BCM), which is also sometimes referred to as critical conduction mode. In this mode of operation the current through the inductor is allowed to fall to zero; however it immediately starts rising again, although in practice it is typically controlled such that it goes a bit negative to allow for power-efficient zero-voltage (or zero-current) turn-on of the control switch. A third mode of operation is illustrated in FIG. 2(c). In this mode, termed discontinuous conduction mode (DCM), the current is pulsed; that is to say, the current rises to a maximum and then falls to zero, and there is a delay before the start of the next current pulse when the current starts to rise again. From the figure the origin for the term "boundary" conduction mode is apparent: this mode represents the boundary between continuous conduction mode and discontinuous conduction mode.

Most current generators operate in continuous conduction mode. If they have been turned off in order to save power and one of the bypass switches stops conducting, the LED current generator needs to be turned on again. Unfortunately, a current converter operated in CCM requires some time for the current to ramp up again; thus the current generator needs to turn on prior to the time when the bypass switch stops conducting. Although it is possible to implement this, additional circuitry is required, which adds to the complexity and cost of the generator.

This situation is illustrated in FIG. 3. This figure shows the pulse width modulation (PWM) signals 301 and 302 for two LED strings. The logical signal NOT OR, 303, corresponds to the time when the converter may be switched off since both LED strings are turned off and consequently no current is required. Thus current is not required when neither bypass switch 301 is conducting (during period 311), nor bypass switch 302 is conducting (during period 312). As shown, during part of the PWM cycle 305, the converter-off signal 303 is high and the converter current 304 is allowed to fall to zero. However, as shown in trace 304, there is a delay between the falling edge of the converter-off trace 303, that is moment t0, and the availability of the full converter current 304, that is moment t1. This delay, being the ramp up time 306, depends heavily on the specific implementation and the application, and may be dependent upon such factors as the inductor, the switching frequency, the input or output voltages, and so forth. No fixed value can thus be determined a priori. The problem may be passed on from the current generator designer to an application engineer through offering a user-adjustable ramp-up lead time. Alternatively, the required lead time may be automatically detected as proposed in applicant's co-pending European patent application no. EPO 8102752.6. This, however, requires a relatively complex circuit, especially when the PWM inputs are not generated on chip.

There thus remains an ongoing need to provide a switched mode power converter for LED applications which provides for high efficiency partial load operation.

SUMMARY OF THE INVENTION

It is an object of the present invention to provide a switched mode power converter and method of operating the same which allows for high efficiency partial load operation.

According to a first aspect of the present invention, there is provided a method of controlling a switched mode power converter comprising an inductor and a switch and providing an output current for LED applications, the method including the sequential steps of:

(a) decreasing the current through the inductor from a maximum value to zero, and (b) immediately thereafter increasing the current through the inductor from zero to the maximum value, and further including the steps of providing an interruption by forcing the switch to be open in response to a first change in a converter control signal, which first change is indicative of an absence of a requirement for every one of a plurality of LED loads, and ending the interruption by ending the forcing open of the switch in response to a second change in the converter control signal, which second change is indicative of a recommencement of the requirement for any one or a plurality of the plurality of LED loads. Thus, according to this aspect of the invention, the above object is met by providing a switched mode power converter which operates in the boundary conduction mode, in combination with cycle-by-cycle control: the method allows for partial load operation by interrupting the boundary conduction mode for a defined period in response to first and second control signals.

For the avoidance of doubt, the phrase "absence of every one" when used in this document is synonymous with the phase "presence of none", rather than merely that not all are present. Thus it is to be interpreted as having the same meaning as the "individual absence of each one". The condition is only met when none are present, and is not met when some, but only some, are present. Correspondingly, "absence of a requirement for every one" is to be interpreted as indicating that each and every one is separately absent a requirement.

Preferably the method further includes a further step of smoothing the output current by means of a smoothing capacitor. This is particularly convenient, in view of the large current ripple which results from boundary conduction mode absent such a smoothing means.

Beneficially, the method may provide that the presence or absence of the requirement for the (i)th one of the plurality of LED loads is determined by a control signal PMW(i,on, and the converter control signal corresponds to the logical combination AND of the PMW(i)_on control signals. Alternatively, the method may provide that the presence or absence of the requirement for the (i)th one of the plurality of LED loads is determined by a control signal PMW(i)_on, and the control signal corresponds to the logical combination NOT AND of the PMW(i)_on control signals. As further alternative, the method may provide that the presence or absence of the requirement for the (i)th one of the plurality of LED loads is determined by a control signal PMW(i)_off, and the converter control signal corresponds to the logical combination NOT OR of the PMW(i)_off control signals. As a yet further alternative, the method may provide that the presence or absence of the requirement for the (i)th one of the plurality of LED loads is determined by a control signal PMW(i)_off, and the control signal corresponds to the logical combination OR of the PMW(i)_off control signals. These four alternatives, in the first and third of which the converter control signal corresponds to a Conv_off signal, and in the second and fourth of which the converter control signal corresponds to a Conv_on signal, provide alternative, simple, methods of controlling the converter, without the requirement for complex circuitry.

According to another aspect of the invention, there is provided an integrated circuit for controlling a boundary conduction mode switched mode power supply and adapted to operate according to the above method. Embodying the required circuitry in a single integrated circuit provides an advantageous reduction in the space requirement of a switched mode power supply.

According to yet another aspect of the invention there is provided a switched mode power converter for LED application, adapted for operation in boundary conduction mode, and for interruption of operation in the absence of every one of a plurality of LED loads. That is to say, the interruption of operation occurs when none of the plurality of LED loads is present. This provides a particularly suitable means of achieving the above object.

Preferably the switched mode power converter comprises a smoothing capacitor. Since the inductor currents in such a switched mode power converter typically varies between zero and twice the required output current, a smoothing capacitor is particularly convenient for reducing the output ripple.

Preferably the switched mode power converter is configured to be a buck converter; alternatively, but not exclusively so, it may be configured to be a buck-boost converter. These converter configurations are particularly suited to be operable in boundary conduction mode when combined with PWM bypass switches.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which.

Figure 1:
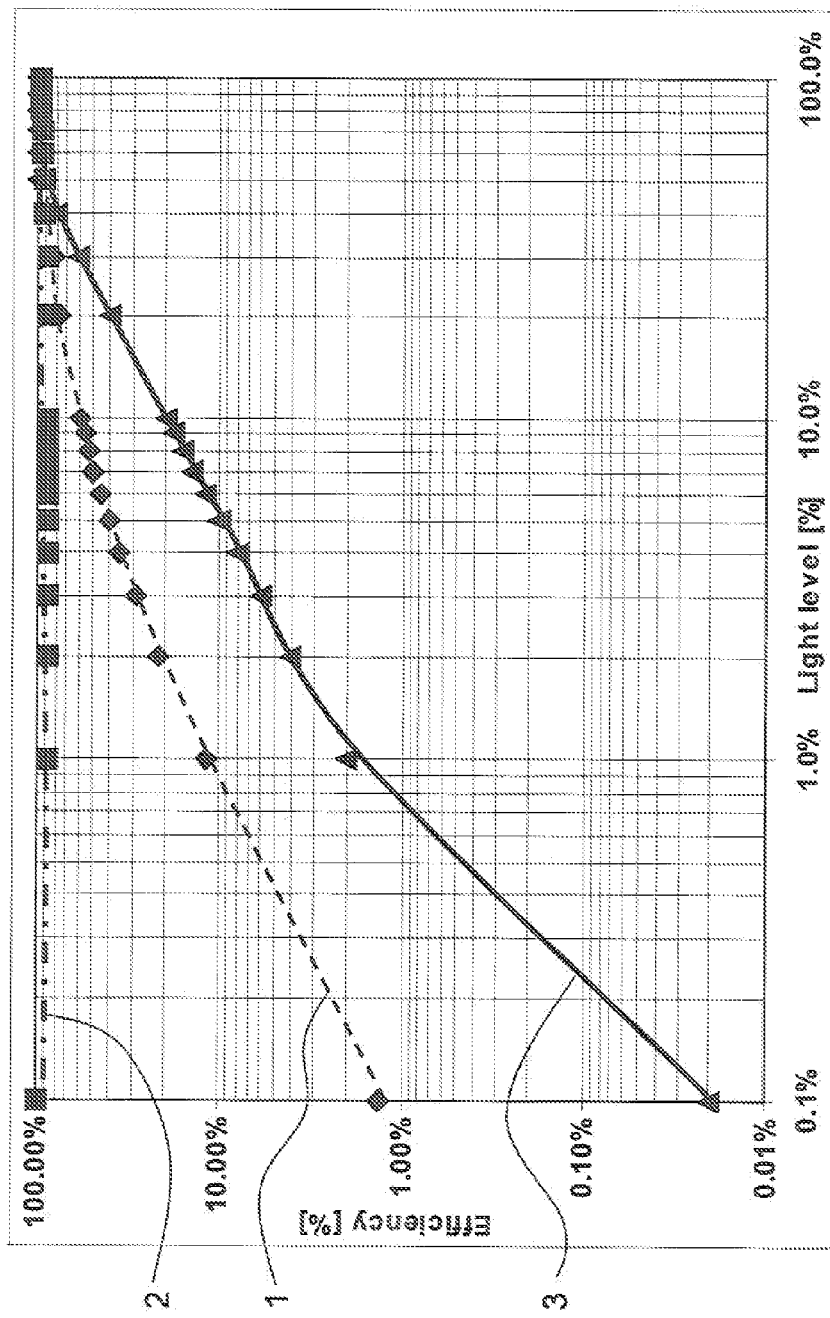
FIG. 1 illustrates the system efficiency difference which may be obtained by switching the current generator for a partial load LED application.
Figure 2:
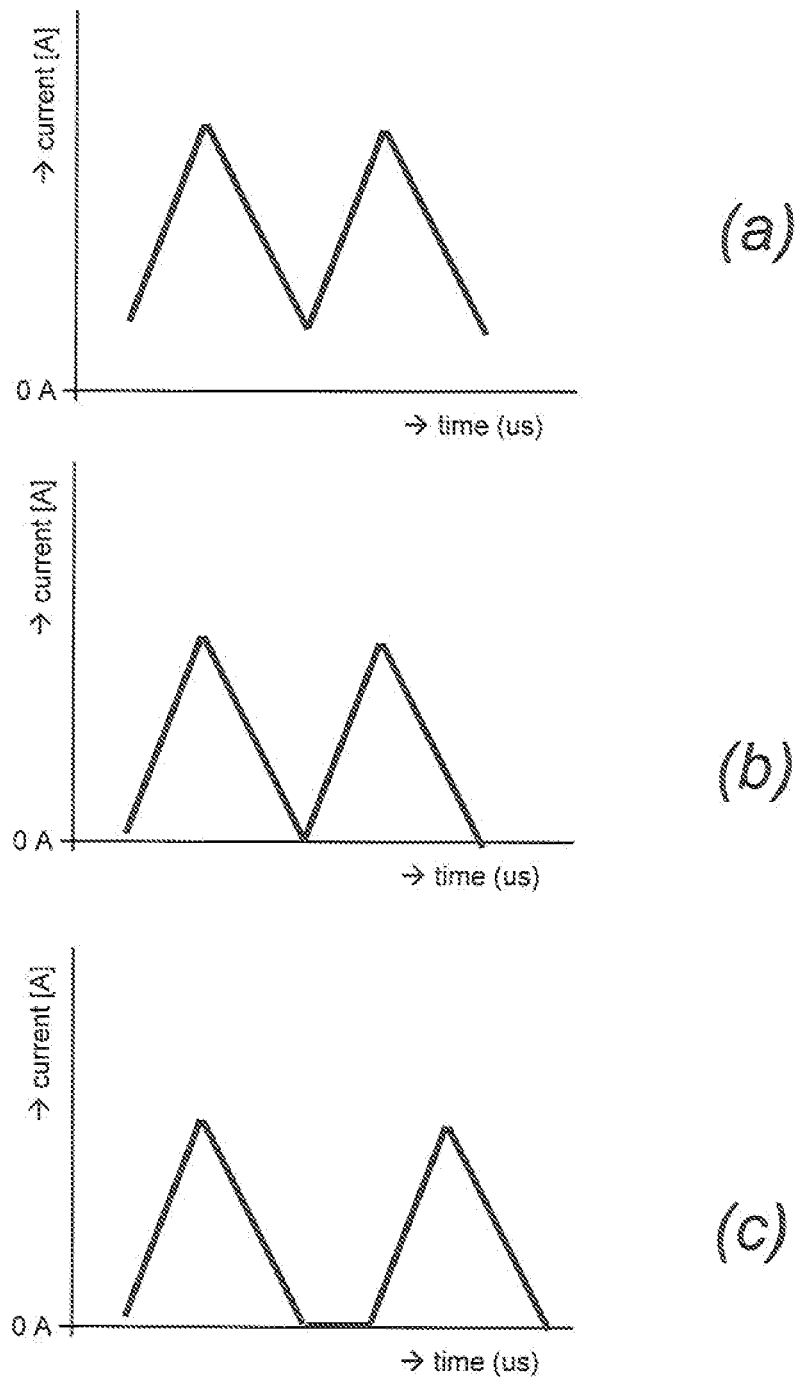
FIG. 2, (a), (b) and (c) pictorially show operation of a switched mode power converter in continuous conduction mode, boundary conduction mode, and discontinuous conduction mode respectively.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments.

DETAILED DESCRIPTION OF EMBODIMENTS

In a method according to one aspect of the present invention, boundary conduction mode (BCM) is used to control the power converter. In this conduction mode the coil current reverts to zero during every conversion cycle. Thus this conduction mode may be characterised by the quasi continuous variation of the inductor current between zero and a maximum level. In order to provide a near constant output current, the maximum level of current through the inductor is thus twice the output current. This represents a large output ripple; thus a smoothing or filter capacitor on the output is generally required. On the other hand, soft switching is enabled since the switching may be performed at zero current or zero voltage. Consequently, for a non-synchronous implementation of the switch-mode power converter the freewheel diode turns off at zero current allowing for a cheap silicon diode instead of an expensive Schottky diode. Moreover, because the boundary conduction mode supports zero current and/or zero voltage switching, switching losses are significantly reduced yielding optimal power efficiency. Component configurations for typical switched mode power converters will be well-known to the skilled person and are thus not shown.

In this aspect of the invention, the method of controlling the converter (which is, in this example, a buck converter) includes cycle-by-cycle current control. Cycle-by-cycle current control involves adjusting the duty cycle of the converter during and on the basis of each complete conversion cycle (during which the inductor or coil current rises from zero to its peak value and returns to zero again). This control principle reacts immediately (within the cycle) on changes in the output load (or input source), and thus allows for LED bypassing.

Figure 3:
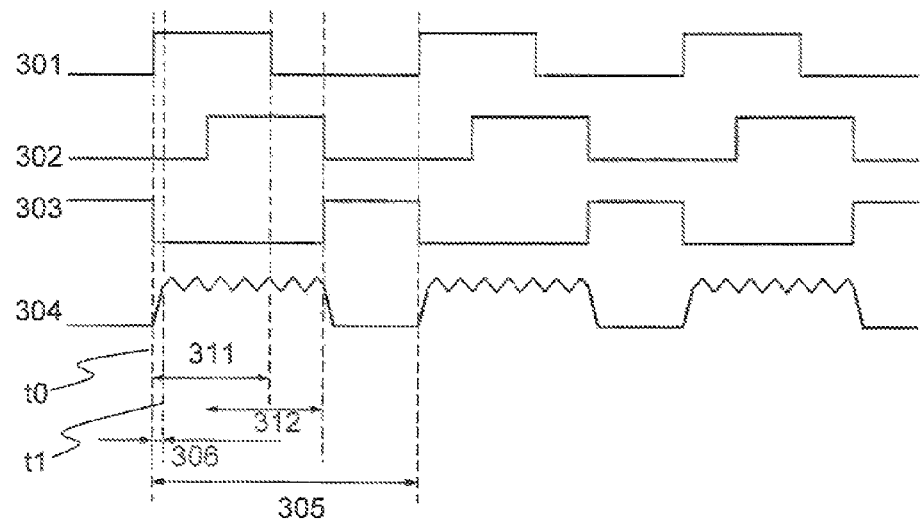
FIG. 3 shows idealised traces of various control signals related to an power converter, together with the resulting converter current, when operating in continuous conduction mode.
Figure 4:
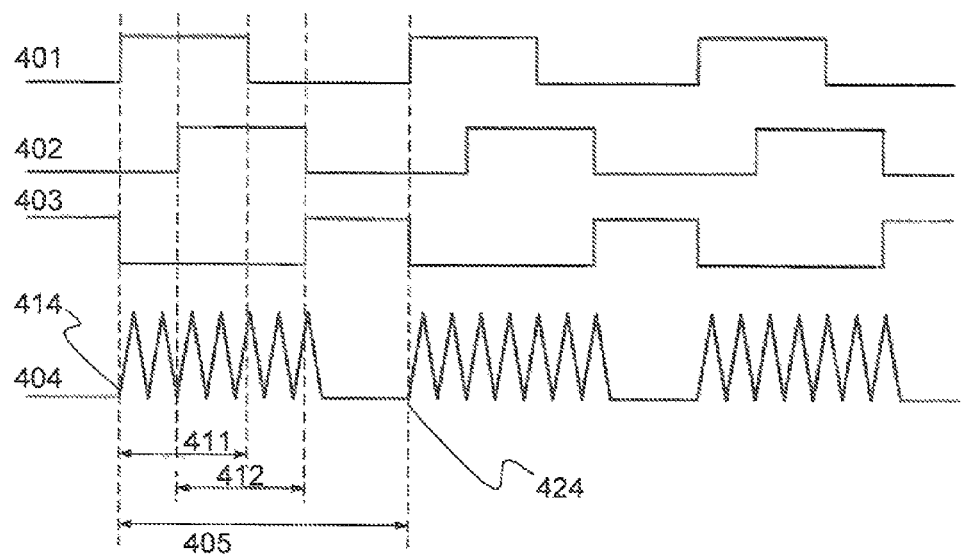
FIG. 4 shows the corresponding control signals and the converter current for an power converter operating in boundary conduction mode.

The converter currents resulting from this aspect of the invention is shown in FIG. 4. Analogous to FIG. 3 for continuous conduction mode, in FIG. 4 the controlled signal for the pulse width modulators for 2 LED strings are shown at traces 401 and 402. The logical NOT OR trace 403 represents the control signal for the converter-off. Thus this control signal determines the part of the total pulse width modulator cycle time 405 during which current is not required from the converter. Bypass switches for the first and second LED channels are open during periods 411 and 412 respectively.

The following four alternatives are possible to determine the converter-off control signal 403:
 1) Conv_off=NOR (LED1_on, LED2on, ... )
 2) Conv_off=AND (LED1_off, LED2_off, ... )
 3) Conv_on=OR (LED1_on, LED2_on, ... )
 4) Conv_on=NAND (LED1_off, LED2_off, ... )
where Conv_off, indicates that the converter-off control signal is high (ie the converter should be off), and Conv_on indicates that the converter-off signal should be low (that is, the converter should be on). The ellipsis ( ... ), indicates that for in circumstances where there are more than two LED channels, each of the channels should be included in the expression.

The four equations above are expressed in terms such as LED1_on, since this provides a convenient and intuitive way of thinking about the relationships; however, it will be immediately apparent that "LED1_on", is directly equivalent to "PWM1_off" (where "PWM1" can be considered to represent the bypass switch), since it is in fact the bypass switches which control whether the LED channels are on or off.

Thus the above four equations to control the Converter-off signal 403 may be equivalently written as:
 5) Conv_off=NOR (PWM1_off, PWM2off, ... )
 6) Conv_off=AND (PWM1_on, PWM2_on, ... )
 7) Conv_on=OR (PWM1_off, PWM2_off, ... )
 8) Conv_on=NAND (PWM 1_on, PWM2_on, ... )

The output from the converter current, before being smoothed with a smoothing capacitor, is shown in trace 404. It should be emphasised that this trace is schematic only, since the converter cycles with a frequency which typically is in the range of hundreds of kilohertz, whilst the pulse width modulated LED strings typically cycle with a frequency of the order of 100 Hz to a few kHz.

As can be seen at nodes 414 and 424, the converter current starts to rise from zero immediately on the falling edge of the converter-off signal 403. Since this represents the start of operation of the converter in boundary conduction mode, it is immediately operating at the appropriate current level for the load. Operation in boundary conduction mode continues throughout the period during which any of the bypass switches are open; that is, whilst converter-off signal 403 is low. Once the converter-off signal 403 goes high at the closing of all of the bypass switches, the power converter is interrupted. Thus the inductor current is allowed to fall to zero; at this moment, the converter switch is not opened thereby preventing the current through the inductor from starting to rise again. Thus the boundary conduction mode operation is interrupted. The interruption is maintained until the converter-off trace 403 returns to zero. This represents a second control signal, a first control signal corresponding to the moment at which the converter-off trace went high. At this moment, shown as node 424 in FIG. 4, the PWM cycle 405 restarts. Put another way, when the converter-off signal 403 goes high, the power converter is switched off, by forcing its switch open: if the switch is already open at the moment of interruption, it is prevented from closing, whilst if the switch is closed at the moment of the interruption, its state is changed to "open". At the end of the interruption, that is to say at the moment when the converter-off signal 403 goes low, the forcing function is removed, so the switch is allowed to close, in order to recommence the normal boundary-conduction mode operation.

Note that FIG. 4, shows an idealised form of the converter current, in that the slope of the converter current is shown as constant. In practice, this slope will vary according to the load; in particular, in general, the frequency will reduce when more LED channels are bypassed.

Since BCM involves no ramp-up lead time, no complex circuitry is required to delay the timing of the (external) PWM signals; only a simple logical combination of the PWM signals driving the LED bypass switches is used to facilitate the switch-on and switch-off of the power converter.

Figure 5:
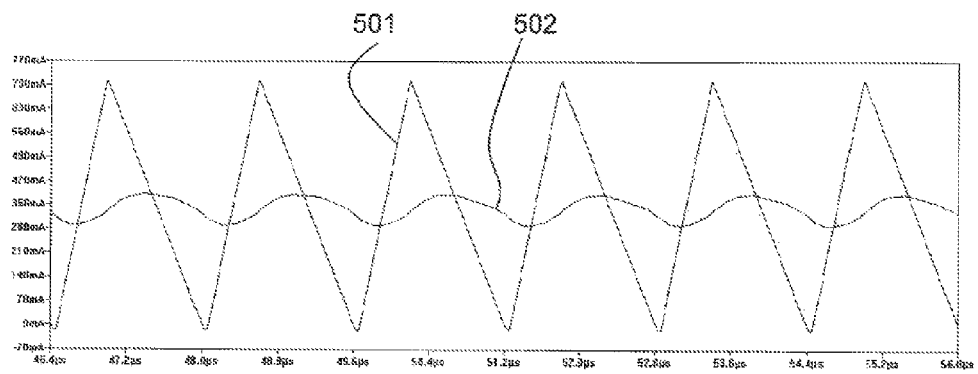
FIG. 5 shows a plot of inductor currents, together with the filtered LED current, for an power converter operated in boundary conduction mode.

FIG. 5 shows the variation of the inductor or coil current in time, and the corresponding variation of the filtered or smoothed LED current. The inductor current takes the shape of a sawtooth 501, which varies between a minimum zero value and a maximum value, 700 mA in this instance, which represents twice the average inductor current value. The smoothed or filtered LED current follows an approximately sinusoidal shape, with a phase lag behind the inductor current 501. The variation in the filtered or smoothed current, is, as to be expected from the operation of the smoothing capacitor, significantly less than that of the inductor current. In this instance the variation is between approximately 280 mA and 380 mA. The function of this smoothing capacitor is thus apparent in avoiding unnecessarily high peak currents being passed to the LED strings.

Figure 6:
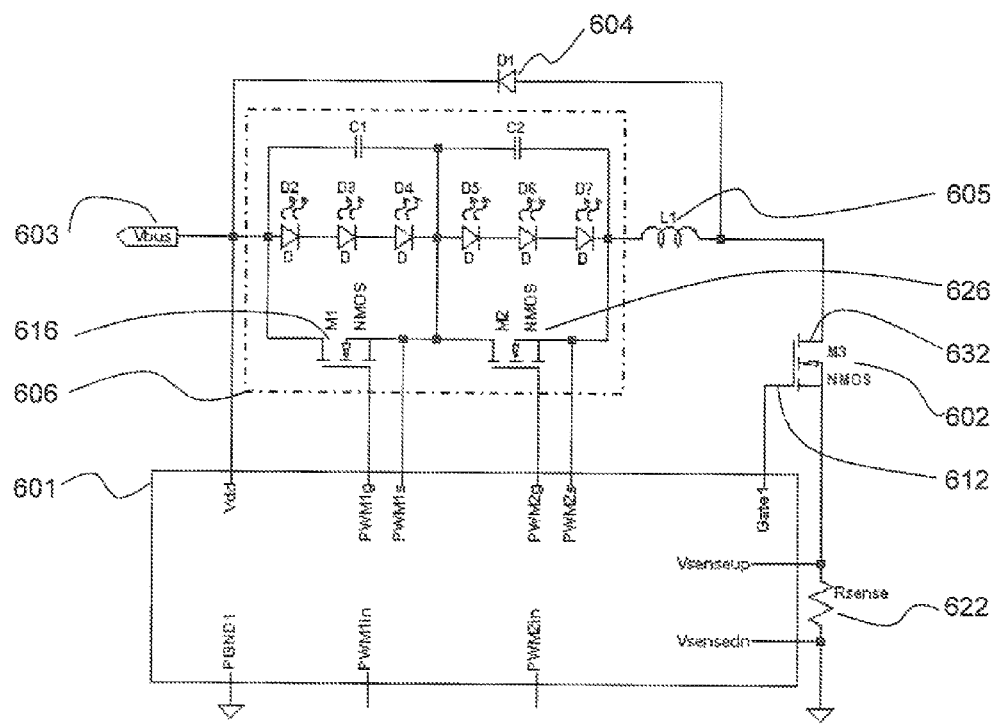
FIG. 6 shows a schematic of a boundary conduction mode buck converter.

FIG. 6 shows a schematic of another controller according to one aspect of the invention, configured to operate in accordance with the above method. The figure includes drivers for 2 PWM circuits, and the associated diode strings. The system comprises driver 601 configured to drive the gate 612 of switch 602, the drain current of which is sensed across Rsense 622. Vbus 603 is connected to the drain 632 of switch 602, via diode D1, 604. The converter is completed by the inductor L1, 605, which is connected between the drain 632 of switch 602 and the LED load circuit 606.

The LED load circuit comprises 2 LED strings: D2, D3 and D4, and D5, D6 and D7 respectively. The strings are switched via PWM switches 616 and 626 respectively; the gate and source of each of PWM switch 616 and 626 are under the control of controller 601. The PWM switches 616 and 626 switch the respective diode strings D2, D3 and D4, and D5, D6 and D7. In parallel with string D2, D3 and D4 is placed a first smoothing capacitor C1, and equivalent smoothing capacitor C2 is placed in parallel with the other LED string D5, D6 and D7.

In operation, the controller controls the operation of switch 602 in order to sequentially charge and discharge inductor L1 (605) through the LED load circuit 606. Current control is provided through the sense resistor 622. In addition the controller 601 controls the PWM switches 616 and 626 in accordance with the respective load requirement of the two LED strings, such that when the respective PWM switch 616 or 626 is closed the respective diode string D2 D3 and D4, or D5, D6 and D7, is bypassed. Capacitors C1 and C2 provide the smoothing function on a string-by-string basis.

Inclusion of the parallel smoothing capacitor introduces some additional complexity when combined with LED bypassing, since it is necessary to disconnect the capacitor before the LED is short circuited, in order to prevent large current spikes. Means to achieve this are described in co-pending European patent application 07112960.5, the entire contents of which are hereby incorporated by reference. In particular, the switch-on of the dimmed segment takes longer compared to the case where there is not a parallel smoothing capacitor for each segment. This is because the segment capacitor C1 needs to charge from basically zero volts. This switch-on delay may be acceptable, as it is small compared to the drive period: typically, the delay may be about 40 μs compared with a drive period of 5 ms. When it is acceptable, the effect on the light output of the LED segment can be ignored. Alternatively, the switch-on delay may be compensated for in the duty cycle of the signals driving the bypass switches 616, 626. The dead time may be calibrated for the LED arrangement, or monitored and automatically compensated for. Active monitoring and correction has the advantage that temperature and ageing effects are automatically taken into account, at the cost of some additional circuitry to measure the switching time and comparing the measured time with the required duty cycle.

Figure 7:
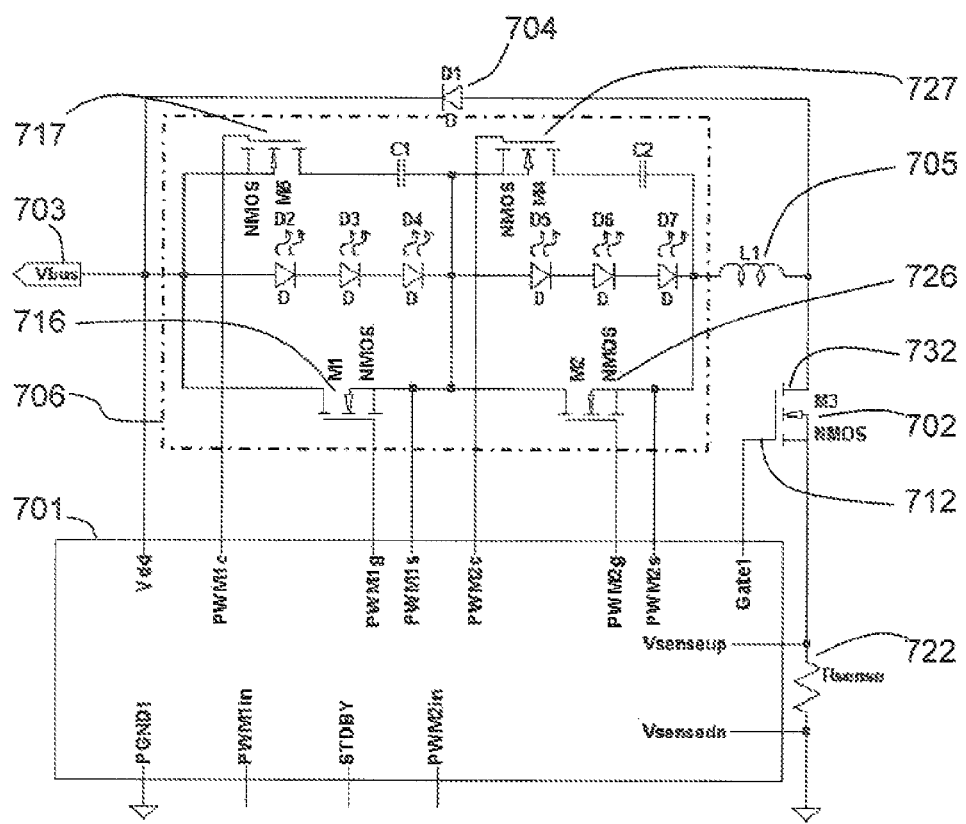
FIG. 7 shows a schematic of a boundary conduction mode buck converter having two bypass switch gate drivers.

As a further alternative, as will be seen in FIG. 7, the segment driver may comprises a bypass switch 716, 716 and a segmented capacitor C1, C2, and is also equipped with a second switch 717, 727 in series with the segmented capacitor C1, C2. The series arrangement of the capacitor and corresponding second switch is connected electrically in parallel to the corresponding LED segment, as is the bypass switch. The second switch and the segmented capacitor are operated to hold the voltage across the LED for the next switch-on phase after the LED is switched off. We thus also refer to the second switch and segmented capacitor as sample-and-hold switch and hold capacitor.

FIG. 7 shows a schematic of another controller according to one aspect of the invention, configured to operate in accordance with the above method. The figure includes drivers for 2 PWM circuits, and the associated diode strings. The system comprises driver 701 configured to drive the gate 712 of switch 702, the drain current of which is sensed across Rsense 722. Vbus 703 is connected to the drain 632 of switch 702, via diode D1, 704. The converter is completed by the inductor L1, 705, which is connected between the drain 632 of switch 702 and the LED load circuit 706.

The LED load circuit comprises 2 LED strings: D2, D3 and D4, and D5, D6 and D7 respectively. The strings are switched via PWM switches 716 and 626 respectively; the gate and source of each of PWM switch 716 and 726 are under the control of controller 701. The PWM switches 716 and 726 switch the respective diode strings D2, D3 and D4, and D5, D6 and D7. In parallel with string D2, D3 and D4 is placed a first smoothing capacitor C1, and equivalent smoothing capacitor C2 is placed in parallel with the other LED string D5, D6 and D7. In order to prevent current spikes from capacitors C1 and C2 through the first and second LED strings respectively, further switches 717 and 727 are placed in series with the respective capacitors C1 and C2 across the first and second LED strings. Switches 717 and 727 are also under the control of controller 701.

In operation, this controller controls the operation of switch 702 in order to sequentially charge and discharge inductor L1 (705) through the LED load circuit 706. Current control is provided through the sense resistor 722. In addition the controller 701 controls the PWM switches 716 and 726 in accordance with the respective load requirement of the two LED strings, such that when the respective PWM switch 716 or 726 is closed the respective diode string D2 D3 and D4, or D5, D6 and D7, is bypassed. Capacitors C1 and C2 provide the smoothing function on a string-by-string basis; switches 717 and 727 prevent deleterious high current discharge effects from respective capacitors C1 and C2. The controller in this aspect includes a standby pin (STDBY), although, since the standby function can by carried out by the combination of PWM controls, it is not necessary to include the pin.

Figure 8:
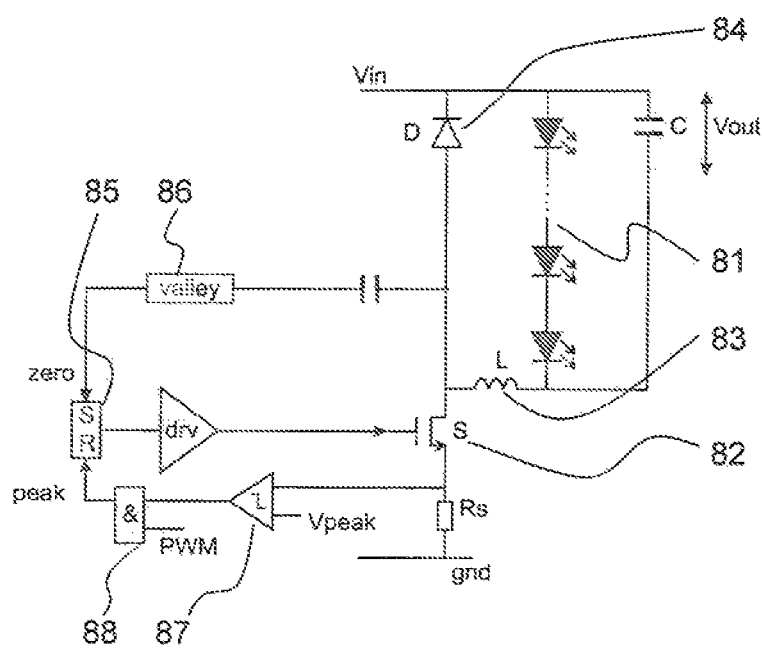
FIG. 8 shows a schematic circuit diagram showing a control circuit for a single string of LEDs.

FIG. 8 shows a schematic circuit diagram, which implements an embodiment of the invention. In this figure, the switched current to an LED string 81 is provided by switch 82, inductor 83 with inductance L and diode 84. Only a single LED string 81 is shown in this figure. Switch 82 is connected to ground by means of sense resistor Rs. The switch 82 is driven by a driver drv, which in turn is enabled by flip-flop 85. The "set" input to the flip-flop is determined by valley or zero detector 86, and the "reset" input by peak detector 87. As shown, the PWM is combined (via "AND" logic 88), with the peak detector; for multiple LED strings, the PWM signal is replaced by the logical combination described above. PWM produces an artificial peak signal, that is to say, it produces a signal which resets the flip-flop 85. This reset signal overrides the zero or valley signal. Thus, during the time interval that the PWM signal is on, or high, the switch 82 is forced to remain in an open state. At the end of the interruption—that is, once the PWM signal switches off (or goes low), the normal operation of the driver circuit is resumed.

It will be appreciated that due to the inherent delays in, for instance, detector circuits and the switching of transistors, there is usually a brief interval between detecting a zero current and bringing the switch back into conduction mode. Therefore, the inductor current will for a brief period, of a few tens of nanoseconds to around 100 ns or 150 ns perhaps, be zero before rising again. As used in this specification and claims, the term "immediately" will be understood by the skilled person to take on its practical meaning, and thus to encompass such a delay period, which is insignificant when considered relative to the period of the converter.

From reading the present disclosure, other variations and modifications will be apparent to the skilled person. Such variations and modifications may involve equivalent and other features which are already known in the art of power converters for LED applications and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

What is claimed is:

1. A switched mode power converter providing an output current for LED applications, the switched mode power converter comprising:
    an inductor,
        wherein the inductor is subjected to a current decreasing from a maximum value to zero, and immediately thereafter, the inductor is subjected to the current increasing from zero to the maximum value;
    a switch, is configured such that,
        wherein the switch is forced to be open in response to a first change in a converter control signal, which first change is indicative of an absence of a requirement for every one of a plurality of LED loads, thereby providing an interruption; and
        wherein the switch is no longer forced to be open in response to a second change in the converter control signal, which second change is indicative of a recommencement of a requirement for one of any one and a plurality of the plurality of LED loads, thereby ending the interruption.

2. The switched mode power converter as recited in claim 1, further comprising an output current smoothing capacitor.

3. The switched mode power converter as recited in claim 1, wherein a presence or an absence of the requirement for an (i)th one of the LED loads is determined by a control signal PMW(i)_on, and the converter control signal corresponds to a logical combination AND of the PMW(i)_on control signals.

4. The switched mode power converter as recited in claim 1, wherein a presence or an absence of the requirement for an (i)th one of the LED loads is determined by a control signal PMW(i)_on, and the control signal corresponds to a logical combination NOT AND of the PMW(i)_on control signals.

5. The switched mode power converter as recited in claim 1, wherein a presence or an absence of the requirement for an (i)th one of the LED loads is determined by a control signal PMW(i)_off, and the converter control signal corresponds to a logical combination NOT OR of the PMW(i)_off control signals.

6. The switched mode power converter as recited in claim 1, wherein a presence or an absence of the requirement for an (i)th one of the LED loads is determined by a control signal PMW(i)_off, and the control signal corresponds to a logical combination OR of the PMW(i)_off control signals.

7. An integrated circuit (IC) for controlling a boundary conduction mode (BCM) switched mode power supply, the integrated circuit comprising:
    a switched mode power converter providing an output current applications, the switched mode power converter including:
    an inductor,
        wherein the inductor is subjected to a current decreasing from a maximum value to zero, and immediately thereafter, the inductor is subjected to the current increasing from zero to the maximum value;
    a switch, is configured such that,
        wherein the switch is forced to be open in response to a first change in a converter control signal, which first change is indicative of an absence of a requirement for every one of a plurality of LED loads, thereby providing an interruption; and
        wherein the switch is no longer forced to be open in response to a second change in the converter control signal, which second change is indicative of a recommencement of a requirement for one of any one and a plurality of the plurality of LED loads, thereby ending the interruption.

8. A switched-mode power converter for LED applications, the switched-mode converter comprising the IC as recited in claim 7.

9. The switched-mode power converter as recited in claim 8, further comprising an output current smoothing capacitor.

10. The switched-mode power converter as recited in claim 8, wherein the switched-mode power converter is configured as a buck converter.

11. The switched-mode power converter as recited in claim 8, wherein the switched-mode power converter is configured as a buck-boost converter.

12. The switched-mode power converter as recited in claim 9, wherein the switched-mode power converter is configured as a buck converter.

13. The switched-mode power converter as recited in claim 9, wherein the switched-mode power converter is configured as a buck-boost converter.

* * * * *